US009846083B2

(12) United States Patent
Emadi et al.

(10) Patent No.: US 9,846,083 B2
(45) Date of Patent: *Dec. 19, 2017

(54) AMBIENT TEMPERATURE MEASUREMENT SENSOR

(71) Applicant: Maxim Integrated Products, Inc., Sunnyvale, CA (US)

(72) Inventors: Arvin Emadi, San Jose, CA (US); Abhishek Sahasrabudhe, Sunnyvale, CA (US); Cheng-Wei Pei, Belmont, CA (US); Pirooz Parvarandeh, Los Altos Hills, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/970,656

(22) Filed: Dec. 16, 2015

(65) Prior Publication Data

US 2016/0178443 A1   Jun. 23, 2016

Related U.S. Application Data

(60) Provisional application No. 62/092,901, filed on Dec. 17, 2014.

(51) Int. Cl.
  *G01J 5/00* (2006.01)
  *G01J 5/16* (2006.01)
  *G01J 5/08* (2006.01)

(52) U.S. Cl.
  CPC .............. *G01J 5/16* (2013.01); *G01J 5/0812* (2013.01)

(58) Field of Classification Search
  None
  See application file for complete search history.

(56) References Cited

U.S. PATENT DOCUMENTS

| 2005/0017175 A1* | 1/2005 | Lee ............... B81B 7/0067 250/338.1 |
| 2006/0262829 A1* | 11/2006 | Manlove ............ G01J 5/16 374/120 |
| 2008/0202209 A1* | 8/2008 | Lambkin ............ G01J 1/04 73/31.05 |
| 2014/0036953 A1* | 2/2014 | Kimura ............ G01J 5/16 374/121 |

(Continued)

*Primary Examiner* — Nina Bhat
(74) *Attorney, Agent, or Firm* — Advent, LLP

(57) ABSTRACT

A sensor package can have a reference thermopile sensor and a reference temperature sensor disposed therein to determine an ambient temperature. In one or more implementations, the sensor package includes a substrate having a substrate surface, a reference thermopile sensor disposed over the substrate surface, a reference temperature sensor disposed over the substrate surface, and a lid assembly disposed over the thermopile sensor and the reference thermopile sensor. The lid assembly includes a structure having a transparent portion that passes electromagnetic radiation occurring in a limited spectrum of wavelengths. The reference thermopile sensor generates a reference thermopile sensor signal representing a difference between a temperature of the substrate surface and a temperature of a lid assembly surface. An external ambient temperature can be determined based upon the reference thermopile sensor signal.

14 Claims, 4 Drawing Sheets

(56) References Cited

U.S. PATENT DOCUMENTS

| | | | |
|---|---|---|---|
| 2015/0076351 A1* | 3/2015 | Noguchi | G01J 5/0225 250/338.3 |
| 2015/0137304 A1* | 5/2015 | Mao | G01J 5/022 257/467 |
| 2016/0079306 A1* | 3/2016 | Kropelnicki | H01L 27/16 257/467 |

* cited by examiner

AMBIENT TEMPERATURE MEASUREMENT SENSOR

BACKGROUND

Thermopile sensors convert thermal energy into electrical energy. These sensors may utilize several thermocouples to generate an output voltage proportional to a local temperature difference (e.g., a temperature gradient). These thermopile sensors may be utilized in the medical industry to measure body temperature, in heat flux sensors, and/or gas burner safety controls.

SUMMARY

The present disclosure is directed to a sensor package having a thermopile sensor, a reference thermopile sensor, and a reference temperature sensor disposed therein to determine an ambient temperature. In one or more implementations, the sensor package includes a substrate having a substrate surface, a thermopile sensor disposed over the substrate surface, a reference thermopile sensor disposed over the substrate surface, a reference temperature sensor disposed over the substrate surface, and a lid assembly disposed over the thermopile sensor and the reference thermopile sensor. The lid assembly includes a structure having a transparent portion that passes electromagnetic radiation occurring in a limited spectrum of wavelengths (e.g., infrared radiation [IR]). The reference thermopile sensor generates a reference thermopile sensor signal representing a temperature difference between a temperature associated with the substrate surface and a temperature associated with a lid assembly surface. An external ambient temperature can be determined based upon the reference thermopile sensor signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Thermopile sensors are utilized in a variety of applications. For example, a thermopile is an infrared radiation (IR) detector (e.g., electromagnetic radiation) that can be used for making non-contact temperature measurements. A thermopile can include several thermocouples coupled together. Thermopiles are used to provide an output in response to temperature as part of a temperature measuring device, such as the infrared thermometers, used to measure body temperature. In some applications, an ambient temperature, such as an external ambient temperature, can be utilized for calibration purposes.

Therefore, the present disclosure is directed to a sensor package having a thermopile sensor, a reference thermopile sensor, and a reference temperature sensor disposed therein to determine an ambient temperature. For example, the ambient temperature may be defined as the temperature of the air external to the sensor package 100 (e.g., the environment surrounding the sensor package 100). In one or more implementations, the sensor package includes a substrate having a substrate surface, a thermopile sensor disposed over the substrate surface, a reference thermopile sensor disposed over the substrate surface, a reference temperature sensor disposed over the substrate surface, and a lid assembly disposed over the thermopile sensor and the reference thermopile sensor. The lid assembly includes a transparent structure that passes electromagnetic radiation occurring in a limited spectrum of wavelengths (e.g., infrared radiation [IR]) and an infrared radiation blocker disposed over the lid assembly. The electromagnetic blocker defines an aperture over the thermopile sensor such that at least a portion of the electromagnetic blocker is positioned over the reference thermopile sensor. The reference thermopile sensor generates a reference thermopile sensor signal representing a temperature difference between a temperature associated with the substrate surface and a temperature associated with a lid assembly surface. An external ambient temperature can be determined based upon the reference thermopile sensor signal.

Example Implementations

Figure 1:
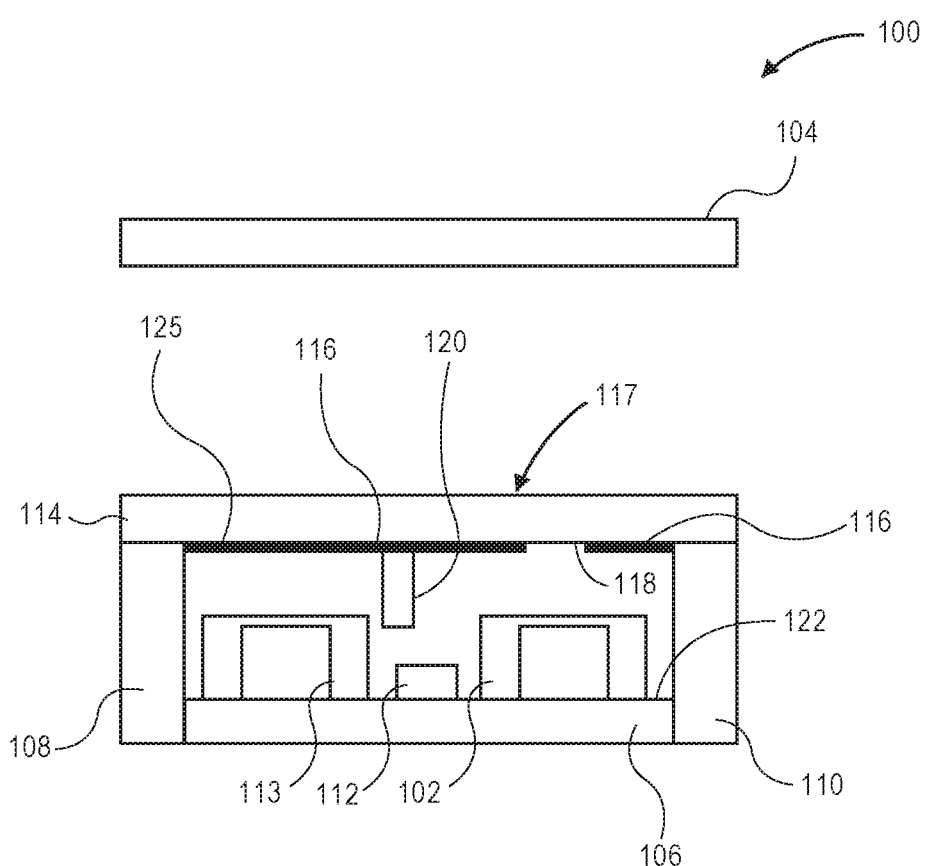
FIG. 1 is a partial cross-sectional side view illustrating a sensor package including a thermopile sensor, a reference thermopile sensor, and a reference temperature sensor disposed therein.

FIG. 1 illustrates an example sensor package 100 in accordance with an example implementation of the present disclosure. As shown, the sensor package 100 includes a thermopile sensor 102 that senses electromagnetic radiation transfer between the thermopile sensor 102 and an object. The thermopile sensor 102 senses changes in electromagnetic radiation transfer and translates the electromagnetic radiation change into a corresponding electrical signal (e.g., converts thermal energy into corresponding electrical energy). For instance, the thermopile sensor 102 translates the electromagnetic radiation change into a corresponding voltage signal. In implementations, the thermopile sensor 102 detects electromagnetic radiation having a first limited spectrum of wavelengths (e.g., wavelengths between a first wavelength and a second wavelength). For example, the thermopile sensor 102 is configured to detect electromagnetic radiation occurring within the infrared spectrum. In some implementations, the thermopile sensor 102 includes an absorber to improve the efficiency of the electromagnetic radiation absorption. For example, the radiation has a wavelength range and an integrated intensity that depends on the temperature of the object.

As shown, the thermopile sensor 102 is positioned over a substrate 106. A first wall structure 108 and a second wall structure 110 are employed adjacent to the substrate 106 to at least partially enclose the thermopile sensor 102. The substrate 106 and the wall structures 108, 110 comprise material that at least substantially prevents the transmission of radiation. For example, the substrate 106 and the wall structures 108, 110 may comprise metal materials, metallic alloys, and ceramic materials, such as glass, $SiO_2$, AlN, and/or $Al_2O_3$.

As shown in FIG. 1, the sensor package 100 includes a reference temperature sensor 112 and a reference thermopile sensor 113. The reference temperature sensor 112 may be positioned over the substrate 106 and adjacent to the thermopile sensor 102 and the reference thermopile sensor 113. As shown, the example sensor package 100 also includes a reference thermopile sensor 113. As discussed herein, the thermopile sensor 102 detects electromagnetic (e.g., infrared) radiation exchange associated the components within the sensor package 100 and an object of interest. The reference thermopile sensor 113 is configured to detect the electromagnetic (e.g., infrared) radiation associated with the components within the sensor package 100. In implementations, as discussed herein, a signal representing the signal from the thermopile sensor 102 is subtracted from the signal from the reference thermopile sensor 113. The subtraction may occur within the digital domain or the analog domain.

In an implementation, the reference temperature sensor 112 detects signals that relate to the temperature reference for the thermopile sensor 102 and the reference thermopile sensor 113. As shown in FIG. 1, the sensor package 100 includes a structure 114 positioned over the thermopile sensor 102 and the object. In implementations, a portion of the structure 114 is transparent to electromagnetic radiation of interest and the other portions of the structure 114 may serve as an electromagnetic blocker. In some instances, the thermopile sensor 102 and the reference thermopile sensor 113 may be integrated together on the same integrated circuit die. In another instance, the thermopile sensor 102 and the reference thermopile sensor 113 may be separate sensors (e.g., fabricated as standalone die). Additionally, in some implementations, the reference temperature sensor 112 may also be incorporated on or integrated with the standalone die having the thermopile sensor 102 and the reference thermopile sensor 113. The reference temperature sensor 112 may comprise a resistive temperature detector (RTD), a complementary metal-oxide semiconductor based temperature sensor, a thermistor, or the like.

Together, the substrate 106, the wall structures 108, 110, and the structure 114 at least partially comprises a package that encloses the thermopile sensor 102 and the reference temperature sensor 112. In implementations, the structure 114 is configured to pass radiation occurring within the limited spectrum of wavelengths (e.g., infrared radiation) and to filter light occurring having a wavelength not within the limited spectrum of wavelengths. In some embodiments, the structure 114 comprises silicon, germanium, other metal alloys, an infrared-transparent polymer, combinations thereof, or the like. As shown, the sensor package 100 includes an electromagnetic blocker 116 positioned at least partially over the structure 114. The electromagnetic blocker 116 is configured to at least substantially prevent transmission of the electromagnetic radiation occurring within the limited spectrum of wavelengths (as well as other stray electromagnetic radiation). The electromagnetic blocker 116 may comprise a metal or any other material that does not transmit the IR wavelengths of interest. Together, the structure 114 and the electromagnetic blocker 116 may form a lid assembly 117. In other implementations, the structure 114 forms the lid assembly 117. In some implementations, the lid assembly 117 comprises two separate (e.g., distinct) structures. For example, a first structure comprises a metal and/or metallic alloys that block (e.g., prevent transmission) electromagnetic radiation occurring within the limited spectrum of wavelengths. The second structure may comprise an infrared transparent material that allows passage (e.g., transmission) of electromagnetic radiation. In some instances, as described below, the second structure may define an aperture 118.

As shown, the lid assembly 117 defines an aperture 118 over the thermopile sensor 102 such that electromagnetic radiation may be transmitted from the object 104 to the thermopile sensor 102 and prevents the transmission of the electromagnetic radiation from the object to the reference thermopile sensor 113. As shown, the aperture 118 can be defined on the interior surface of the package cavity. However, the aperture 118 can be defined on the exterior surface of the package structure 114 (e.g., side opposite the interior surface). Thus, the thermopile sensor 102 and the reference thermopile sensor 113 are configured to detect temperature variations/gradients within the sensor package 100 (e.g., detect electromagnetic radiation occurring with the limited spectrum of wavelengths emitted from the substrate 106, the wall structures 108, 110, and the structure 114). The thermopile sensor 102 also detects electromagnetic radiation occurring with the limited spectrum of wavelengths emitted from the object. In other words, the thermopile sensor 102 generates an electrical signal that corresponds to the electromagnetic radiation emitted from the object 104 (as well as within the package) and the reference thermopile sensor 113 generates an electrical signal that corresponds to electromagnetic radiation emitted within the sensor package 100.

In some implementations, the sensor package 100 includes a berm (e.g., barrier) structure 120 that would be configured to mitigate electromagnetic radiation that entered through the aperture 118 to reach the reference thermopile sensor 113. The berm structure 120 may comprise any suitable material that prevents transmission of electromagnetic radiation within the limited spectrum of wavelengths.

The reference thermopile sensor 113 is configured to measure the temperature of ambient air. For example, the reference thermopile sensor 113 outputs an electrical signal that is a function of a temperature associated with the lid assembly 117 and a temperature associated with a first (e.g., bottom) surface 122 of the sensor package 100. For example, the output of the reference thermopile sensor 113 can be modeled by:

$$V_{TP\text{-}dark} = P\left(T_{package\text{-}top}^{4-\delta} - T_{package\text{-}bottom}^{4-\delta}\right) \approx \qquad \text{EQN. 1}$$

$$P \cdot (4-\delta) \cdot T_{package\text{-}bottom}^{3-\delta} \cdot \left(T_{package\text{-}top} - T_{package\text{-}bottom}\right)$$

Figure 2:
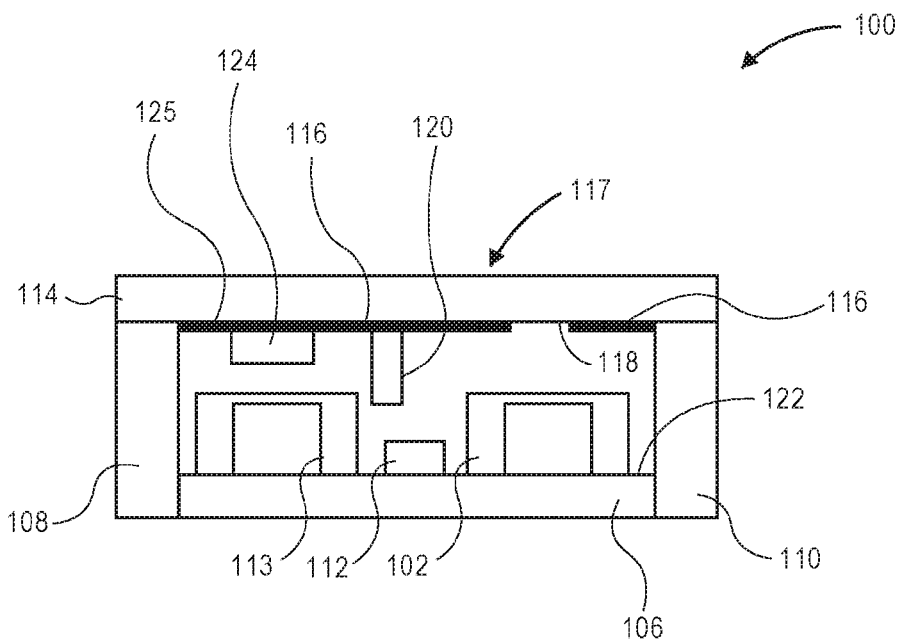
FIG. 2 is a partial cross-sectional side view illustrating another implementation of a sensor package including a sensor package including a thermopile sensor, a reference thermopile sensor, a reference temperature sensor, and a heating element.

FIG. 2 illustrates a sensor package 100 in accordance with another example implementation of the present disclosure. In this implementation, the sensor package 100 includes a reference temperature sensor 124 disposed over a second (e.g., top) surface 125 that is opposite the first surface 122. For example, the reference temperature sensor 124 is positioned over the lid assembly 117. In an implementation, the reference temperature sensor 124 comprises a thermistor disposed over the lid assembly 117. The reference temperature sensor 124 is configured to detect signals that relate to the temperature reference for the thermopile sensor 102 and the reference thermopile sensor 113. For example, these signals may be utilized to provide additional temperature references for corrective measures, or the like. In some implementations, the reference thermopile sensor 113 may not be employed when the sensor package 100 employs the reference temperature sensor 124.

Figure 3:
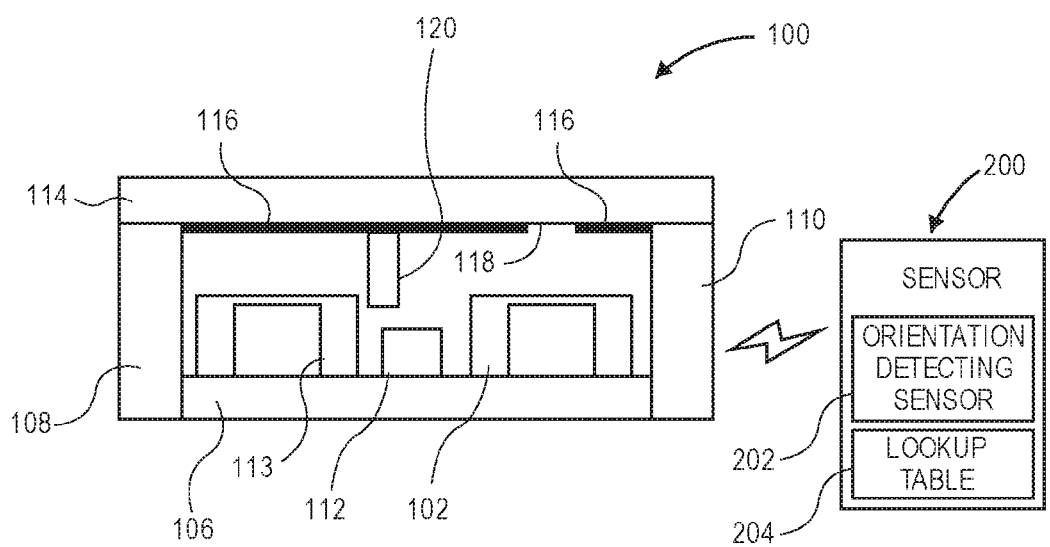
FIG. 3 is a partial cross-sectional side view illustrating the sensor package shown in FIG. 1, where the thermopile sensor, the reference thermopile sensor, and the reference temperature sensor are communicatively connected to a temperature sensor.

Referring to FIG. 3, a temperature sensor 200 may be employed to generate a signal representing the ambient air temperature. In implementations, the temperature sensor 200 may comprise application-specific integrated circuitry configured to receive signals generated by the thermopile sensor 102, the reference temperature sensor 112, the reference thermopile sensor 113, and/or the reference temperature sensor 124 and generate a signal representing the ambient temperature about the sensor package 100. For example, the temperature sensor 200 generates a signal representing the ambient temperature outside of the sensor package 100. In some implementations, the temperature sensor 200 may employ an orientation detection sensor 202 that is configured to provide a signal representing an orientation of the sensor package 100. In an implementation, the orientation detection sensor 202 comprises a gyroscope.

Figure 4:
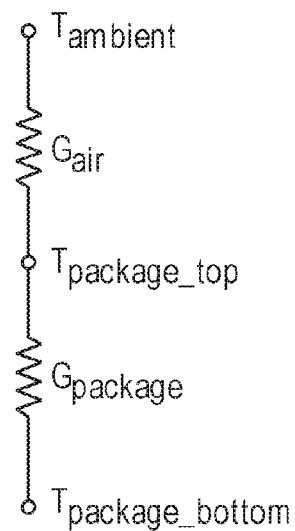
FIG. 4 illustrates a thermal equivalent model of the sensor package shown in FIG. 1.

FIG. 4 illustrates a thermal equivalent model of the sensor package 100, and the ambient temperature can be modeled by (where G represents thermal conductance):

$$Gair(Tambient - Tpackage_{top}) = Gpackage(Tpackage_{top} - Tpackage_{bottom}) \quad \text{EQN. 2}$$

EQN. 2 can be rewritten to:

$$Tambient = \frac{1}{\left(1 + \frac{Gpackage}{Gair}\right)} [Tpackage_{top} - Tpackage_{bottom}] + Tpackage_{top} \quad \text{EQN. 3}$$

EQN. 3 can be rewritten to:

$$Tambient = \left(1 + \frac{Gpackage}{Gair}\right)(Tpackage_{top} - Tpackage_{bottom}) + Tpackage_{bottom} \quad \text{EQN. 4}$$

which can be written to:

$$Tambient = Tpackage_{bottom} + \gamma(Tpackage_{top} - Tpackage_{bottom}) \quad \text{EQN. 5}$$

The term γ is a package characteristic which depends on package thermal resistance. In another form, the ambient temperature can be modeled by:

$$Tambient = Tpackage_{bottom} + \gamma(\phi,T)(Tpackage_{top} - Tpackage_{bottom}) \quad \text{EQN. 6}$$

The term γ(φ,T) is experimentally and/or analytically characterized for different values of ambient temperatures, ambient humidity, and/or pressure (where φ represents sensor orientation detected by the orientation detection sensor 202 and T represents ambient temperature). There may be additional correction terms (factors) that depends on factors such as but not limited to sensor orientation (s) and air flow (v). As described above, the orientation detection sensor 202 is configured to determine an orientation of the orientation detection sensor 202, which provides a signal representing an orientation of the sensor package 100.

Thus, measurement of ambient temperature depends on measuring of the temperature associated with the first surface 122 (e.g., $Tpackage_{bottom}$) and determining ($Tpackage_{top} - Tpackage_{bottom}$). The temperature associated with the first surface 122 is measured by reference temperature sensor 112 positioned over the first surface 122 (e.g., the reference temperature sensor 112 measures the temperature associated with the bottom of the sensor package 100) and generates a signal representing the temperature associated with the first surface 122. The reference thermopile sensor 113 measures the temperature difference associated with the second surface 125 (e.g., reference thermopile sensor 113 measures a temperature associated with the lid assembly 117 [i.e., the top of the sensor package 100]) and the temperature associated with the first surface 122. For example, the reference thermopile sensor 113 generates a signal that represents the temperature difference between the top of the sensor package 100 and the bottom of the sensor package 100 (e.g., ($Tpackage_{top} - Tpackage_{bottom}$)).

Relating the term ($Tpackage_{top} - Tpackage_{bottom}$) with EQN. 1, the ambient temperature can be modeled by $$T_{ambient} = T_{package_{bottom}} + \mu \cdot V_{TP\text{-}dark} \quad \text{EQN. 7}$$

The term $T_{package_{bottom}}$ models the temperature associated with the first surface 122, which is measured by the reference temperature sensor 112 (or other temperature sensors), u is a variable of sensor package 100 temperature, ambient humidity, pressure, and/or the orientation of the sensor. The term $V_{TP\text{-}dark}$ represents the output signal generated by the reference thermopile sensor 113. The term μ may be derived from experimental and/or analytical calculation. For example, the temperature sensor 200 may employ a lookup table 204 such that a low-power processor can avoid calculating complex fitting equation.

Figure 5:
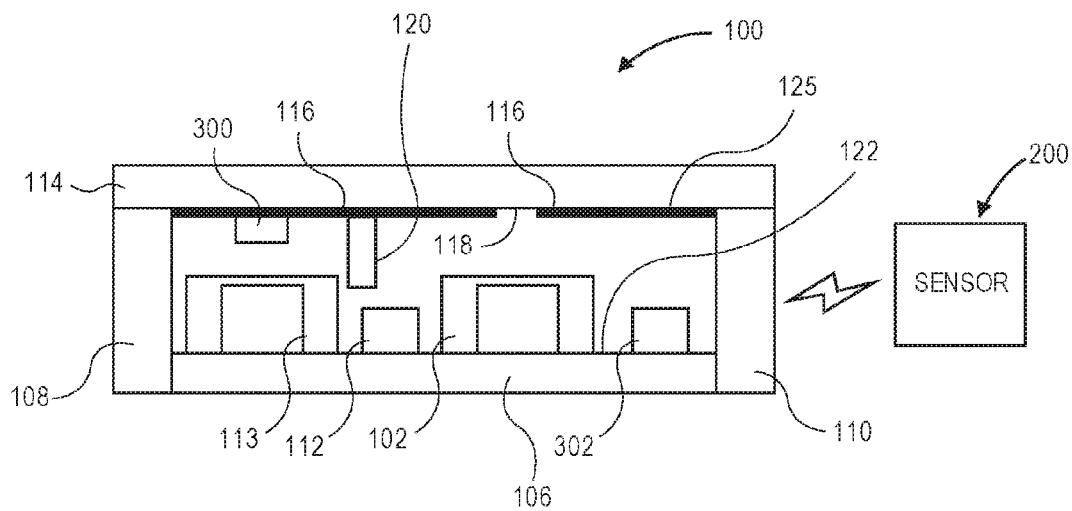
FIG. 5 is a partial cross-sectional side view illustrating the sensor package shown in FIG. 1, where the thermopile sensor, the reference thermopile sensor, two heating elements, and the reference temperature sensor are communicatively connected to a temperature sensor.

As shown in FIG. 5, the sensor package 100 may employ a heating element 300 that generates a known amount of electromagnetic radiation (e.g., generates a known amount of heat). The heating element 300 can be positioned proximate to the first surface 122 to change the temperature of the first surface 122 relative to the other components that comprise the sensor package 100. The sensor package 100 may also employ a second heating element 302 that is positioned over the second surface 125 to change the temperature of the second surface 125 relative to the other components that comprise the sensor package 100. It is contemplated that the heating elements 300, 302 may be employed within the lid assembly 117. For example, the heating elements 300, 302 may be embodied as metallization layers that provide current through the layer to heat the sensor package 100.

Assuming that μ is an unknown parameter, the temperature associated with the first surface 122 (e.g., $T_{package_{bottom}}$) and/or the temperature associated with the second surface 125 (e.g., $T_{package_{top}}$) can be modified by utilizing the respective heating element 300, 302 that results in two different measurements. Also, assuming γ and $T_{ambient}$ will not change, both μ and $T_{ambient}$ can be determined utilizing the aforementioned equations.

As shown in FIG. 5, the temperature sensor 200 is operatively connected to the heating elements 300, 302 and is configured to cause the heating elements 300, 302 to cause the respective surfaces 122, 125 to change temperature. The temperature sensor 200 is also configured to receive the signals from the thermopile sensor 102, the reference temperature sensor 112, and the reference thermopile sensor 113. The temperature sensor 200 provides functionality to determine ambient temperature external to the sensor package 100. In one or more implementations, the temperature sensor 200 may be implemented utilizing hardware (e.g., fixed logic circuitry such as integrated circuits), software, firmware, or a combination thereof.

In an implementation, a first measurement is obtained. For example, the heating element 302 (and/or heating element 300) is caused to operate in a first operational state. For instance, the heating element 302 (and/or heating element 300) may be emitting radiation in a first operational state (or not operational) to cause the first surface 122 and the second surface 125 to have a first known temperature. The first measurement may be modeled by:

$$T_{ambient} = T_{package_{bottom1}} + \mu \cdot V_{TP\text{-}dark1} \quad \text{EQN. 8}$$

The temperature sensor 200 receives the signals generated by the thermopile sensor 102, the reference temperature sensor 112, and/or the reference thermopile sensor 113. A second measurement may then be obtained, and the second measurement may be modeled by:

$$T_{ambient} = T_{package_{bottom2}} + \mu \cdot V_{TP\text{-}dark2} \quad \text{EQN. 9}$$

For example, the heating element 302 (and/or heating element 300) is caused to operate in a second operational state. For instance, the heating element 302 (and/or heating element 300) may be emitting radiation to cause the first surface 122 and the second surface 125 to have a second known temperature.

Having the two measurements, $T_{ambient}$ and $\mu$ can be determined by the temperature sensor 200 utilizing the first measurements and the second measurements obtained from the reference temperature sensor 112 and the reference thermopile sensor 113. For example, the ambient temperature can be modeled by:

$$T_{ambient} = T_{package\_bottom1} + (T_{package_{bottom2}} - T_{package_{bottom1}})/(V_{TP\text{-}dark1} - V_{TP\text{-}dark2}) \times V_{TP\text{-}dark1} \quad \text{EQN. 10}$$

Thus, the temperature sensor 200 utilizes EQN. 10 to determine the ambient temperature external to the sensor package 100. In an implementation, the sensor package 100 has the capability to do self-calibration during the measurement and/or when in use. In another implementation, this calibration is done during automatic testing and an initial value for $\mu$ is stored in the temperature sensor 200 (or other type of memory associated with the sensor package 100). The dependency of this initial value with temperature, humidity, pressure and orientation is determined further experimentally or analytically and stored in a memory device (e.g., stored in the look-up table 204).

In other implementations, a temperature associated with a surface adjacent to the sensor package 100 may be taken into account. For example, this surface may be a surface associated with a cover of a device employing the sensor package 100 (e.g., a smart phone, a tablet, etc.). In yet another implementation, an alternating current signal may be applied to the heating element 300 and/or the heating element 302. In this implementation, the reference thermopile sensor 113 is configured to detect the change in the emitted radiation based upon the changing alternating current signal. The temperature sensor 200 can utilize the alternating current signal to calculate the ambient temperature. For example, the temperature of the lid assembly 117 and the temperature associated with the surface 122 corresponds (e.g., is related to) the respective heating elements 300, 302. Thus, $(T_{package\_bottom} - T_{package\_top})$ and/or $V_{TP\text{-}Dark}$ is a function of $(I_{bottom} - I_{top})$, and the alternating current difference can be utilized to determine $T_{ambient}$ and/or $\mu$ utilizing the above-referenced equations. In other words, a change in the alternating currents through the respective heating elements 300, 302 (top and bottom heating elements) can be used to determine the ambient temperature.

Example Method

Figure 6:
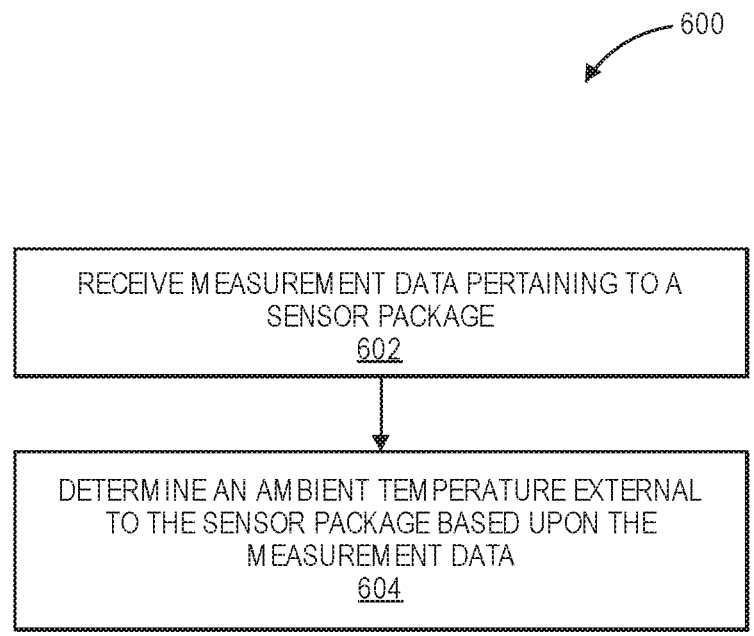
FIG. 6 is a flow diagram illustrating an example method for determining a temperature of an ambient environment proximate to the a sensor package.

FIG. 6 illustrates an example method 600 for determining (e.g., calculating) the temperature of the ambient environment proximate to a sensor package 100. As shown in FIG. 6, measurement data pertaining to a sensor package is received (Block 602). For instance, as described above, the heating element 302 (and/or heating element 300) is caused to operate in a first operational state. For instance, the heating element 302 (and/or heating element 300) may be emitting radiation in a first operational state (or not operational) to cause the first surface 122 and the second surface 125 to have a first known temperature. Additionally, the temperature sensor 200 receives the signals generated by the thermopile sensor 102, the reference temperature sensor 112, and/or the reference thermopile sensor 113. For example, the heating element 302 (and/or heating element 300) is caused to operate in a second operational state. For instance, the heating element 302 (and/or heating element 300) may be emitting radiation to cause the first surface 122 and the second surface 125 to have a second known temperature.

Referring to FIG. 6, an ambient temperature external to the sensor package is determined based upon the measurement data (Block 602). For instance, $T_{ambient}$ and $\mu$ can be determined by the temperature sensor 200 utilizing the first measurements and the second measurements obtained from the reference temperature sensor 112 and the reference thermopile sensor 113 (see EQN. 10). Thus, the temperature sensor 200 can determine the ambient temperature external to the sensor package 100.

In some implementations, the sensor package 100 can measure an ambient temperature of an indoor environment. For instance, the object 104 may comprise a wall, ceiling, window, or floor of an indoor (e.g., interior) environment. The sensor package 100 may be positioned such that the aperture 118 is oriented (e.g., aligned) to the object 104 such that electromagnetic radiation from the object 104 passes through the aperture 118 and is received at the thermopile sensor 102. Thus, the sensor package 100 and/or the temperature sensor 200 can determine an ambient temperature of the indoor environment utilizing the signals generated by the thermopile sensor 102, the reference temperature sensor 112, and/or the reference thermopile sensor 113 as discussed above. For instance, a user may can orient (e.g., point, align) the sensor package 100 to an interior surface of an enclosed room to measure the ambient temperature of the enclosed room.

CONCLUSION

Generally, any of the functions described herein can be implemented using hardware (e.g., fixed logic circuitry such as integrated circuits), software, firmware, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A sensor package comprising:
   a substrate having a substrate surface;
   a thermopile sensor disposed over the substrate surface;
   a reference thermopile sensor disposed over the substrate surface;
   a reference temperature sensor disposed over the substrate surface; and
   a lid assembly having a lid assembly surface, the lid assembly disposed over the thermopile sensor, the reference thermopile sensor, and the reference temperature sensor, the lid assembly comprising a transparent portion that passes electromagnetic radiation occurring in a limited spectrum of wavelengths,
   wherein the reference thermopile sensor is configured to generate a reference thermopile sensor signal representing a temperature difference between a temperature associated with the substrate surface and a temperature associated with the lid assembly surface, wherein an external ambient temperature is determined based upon the reference thermopile sensor signal.

2. The sensor package as recited in claim 1, further comprising a first heating element disposed over the substrate surface for heating the substrate surface and a second heating element disposed over the lid assembly surface for heating the lid assembly surface.

3. The sensor package as recited in claim 1, the lid assembly further comprising an electromagnetic blocker, wherein at least a portion of the electromagnetic blocker is positioned over the reference thermopile sensor, the electromagnetic blocker configured to at least substantially block the electromagnetic radiation occurring in a limited spectrum of wavelengths.

4. The sensor package as recited in claim 3, wherein the electromagnetic blocker comprises a metallic material.

5. The sensor package as recited in claim 1, further comprising a first wall structure and a second wall structure disposed adjacent to the substrate.

6. The sensor package as recited in claim 1, further comprising a berm structure disposed between the aperture and the reference thermopile sensor to at least substantially prevent transmission of the electromagnetic radiation occurring in a limited spectrum of wavelengths that passes through the aperture to the reference thermopile sensor.

7. The sensor package as recited in claim 1, wherein the thermopile sensor and the reference thermopile sensor are integrated within the same integrated circuit die.

8. The sensor package as recited in claim 6, wherein the reference temperature sensor is integrated within the integrated circuit die.

9. A system comprising:
   a sensor package, the sensor package comprising:
   a substrate having a substrate surface;
   a thermopile sensor disposed over the substrate surface, the thermopile sensor configured to generate a first electrical signal based upon detected electromagnetic radiation;
   a reference thermopile sensor disposed over the substrate surface, the reference thermopile sensor configured to generate a second electrical signal based upon detected electromagnetic radiation;
   a reference temperature sensor disposed over the substrate surface, the reference temperature sensor configured to generate a signal representing a temperature associated with the thermopile sensor and the reference thermopile sensor;
   a lid assembly having a lid assembly surface, the lid assembly disposed over the thermopile sensor and the reference thermopile sensor, the lid assembly comprising a structure including a transparent portion that passes electromagnetic radiation occurring in a limited spectrum of wavelengths,
   wherein the reference thermopile sensor is configured to generate a reference thermopile sensor signal representing a temperature difference between a temperature associated with the substrate surface and a temperature associated with the lid assembly surface; and
   a temperature sensor in electrical communication with the sensor package, the temperature sensor configured to generate an ambient temperature signal based upon the reference thermopile sensor signal, the ambient temperature signal representing an ambient temperature.

10. The system as recited in claim 9, further comprising a first heating element disposed over the substrate surface for heating the substrate surface and a second heating element disposed over the lid assembly surface for heating the lid assembly surface.

11. The system as recited in claim 9, the lid assembly further comprising an electromagnetic blocker, wherein the electromagnetic blocker comprises a metallic material.

12. The system as recited in claim 9, further comprising a first wall structure and a second wall structure disposed adjacent to the substrate.

13. The system as recited in claim 9, wherein the temperature sensor is configured to determine an ambient temperature of an enclosed interior area based upon the detected electromagnetic radiation, the detected electromagnetic radiation comprising a temperature associated with a surface within the enclosed interior area.

14. The system as recited in claim 9, wherein the external ambient temperature is modeled by $T_{ambient} = T_{package\_bottom1} + (T_{package_{bottom2}} - T_{package_{bottom1}})/(V_{TP-dark1} - V_{TP-dark2}) \times V_{TP-dark1}$.

* * * * *